(12) United States Patent
Steiner

(10) Patent No.: US 10,136,659 B1
(45) Date of Patent: Nov. 27, 2018

(54) CHOCOLATE WAX COMPOSITION FOR CANDLES

(76) Inventor: Jonathan Steiner, Glendale, CA (US)

( * ) Notice: Subject to any disclaimer, the term of this patent is extended or adjusted under 35 U.S.C. 154(b) by 1483 days.

(21) Appl. No.: 13/365,431

(22) Filed: Feb. 3, 2012

Related U.S. Application Data

(60) Provisional application No. 61/440,497, filed on Feb. 8, 2011.

(51) Int. Cl.
*A23G 1/50* (2006.01)
*C11C 5/00* (2006.01)

(52) U.S. Cl.
CPC .............. *A23G 1/507* (2013.01); *C11C 5/004* (2013.01); *C11C 5/006* (2013.01); *C11C 5/008* (2013.01)

(58) Field of Classification Search
USPC ........................................................ 431/288
See application file for complete search history.

(56) References Cited

U.S. PATENT DOCUMENTS

| | | | | |
|---|---|---|---|---|
| 545,698 | A * | 9/1895 | Johnson | 426/420 |
| 3,088,302 | A | 5/1963 | Koch | |
| 3,175,876 | A * | 3/1965 | Fredericks | C11C 5/002 |
| | | | | 422/126 |
| 3,395,020 | A * | 7/1968 | Chozianin et al. | 426/237 |
| 3,544,328 | A * | 12/1970 | Dunning et al. | 426/660 |
| 3,630,697 | A * | 12/1971 | Duling et al. | 44/275 |
| 4,131,415 | A | 12/1978 | Flinn et al. | |
| 4,151,308 | A * | 4/1979 | Ziccarelli et al. | 426/613 |
| 4,923,708 | A * | 5/1990 | Given, Jr. | A23D 7/0053 |
| | | | | 426/607 |
| 4,950,145 | A | 8/1990 | Zanetos et al. | |
| 6,099,877 | A | 8/2000 | Schuppan | |
| 6,406,733 | B1 | 6/2002 | Willcocks et al. | |
| 6,599,334 | B1 | 7/2003 | Anderson | |
| 6,652,897 | B1 | 11/2003 | Stewart | |
| 6,730,137 | B2 * | 5/2004 | Pesu et al. | 44/275 |
| 6,758,869 | B2 * | 7/2004 | Roeske | C10L 5/00 |
| | | | | 431/288 |
| 6,852,140 | B1 * | 2/2005 | Roeske | C11C 5/002 |
| | | | | 431/288 |
| 7,192,457 | B2 * | 3/2007 | Murphy et al. | 44/275 |
| 7,442,036 | B2 * | 10/2008 | Kubicek et al. | 431/289 |
| 7,497,685 | B2 * | 3/2009 | Kubicek et al. | 431/298 |
| 7,524,187 | B2 * | 4/2009 | Kubicek et al. | 431/291 |
| 7,588,607 | B1 * | 9/2009 | Cap | 44/275 |
| D621,576 | S * | 8/2010 | Quick | D1/106 |
| 8,603,197 | B2 * | 12/2013 | Lemke et al. | 44/275 |
| 2004/0221503 | A1 * | 11/2004 | Murphy | C11C 5/008 |
| | | | | 44/275 |

(Continued)

*Primary Examiner* — Avinash A Savani
*Assistant Examiner* — Martha M Becton
(74) *Attorney, Agent, or Firm* — John D Gugliotta

(57) ABSTRACT

A candle or candle composition is provided made from only edible materials and is formed from palatably desirable compositions. Cocoa butter and chocolate at a ratio of between approximately three parts to approximately five parts cocoa butter to one part chocolate provides a composition that is moldable and capable of being formed into a self supporting candle structure that is capable of being lit and maintaining a flame. At the same time, the unignited portions, when melted, creates a pool of melted, edible chocolate flavor material. Inclusion of trace amounts of sugar and vanilla improve the palatability and gastronomic effect of the melted material.

6 Claims, 1 Drawing Sheet

(56) References Cited

U.S. PATENT DOCUMENTS

| | | | |
|---|---|---|---|
| 2005/0175745 A1* | 8/2005 | Zawistowski | A21D 2/14 426/321 |
| 2006/0157894 A1* | 7/2006 | Couch et al. | 264/330 |
| 2007/0231427 A1* | 10/2007 | Ream | A21D 13/0087 426/5 |
| 2008/0248186 A1* | 10/2008 | Bruse | A23G 1/38 426/631 |
| 2012/0213893 A1* | 8/2012 | Dimas | A23G 3/54 426/103 |
| 2014/0199646 A1* | 7/2014 | Beadles | C11C 5/002 431/288 |
| 2015/0313253 A1* | 11/2015 | Slager | A23G 1/0006 426/601 |

\* cited by examiner

CHOCOLATE WAX COMPOSITION FOR CANDLES

RELATED APPLICATIONS

The present invention claims the benefit of U.S. Provisional Application No. 61/440,497 filed on Feb. 8, 2011. There are no other previously filed, nor currently any co-pending applications, anywhere in the world.

BACKGROUND OF THE INVENTION

1. Field of the Invention

The present invention relates generally to candles or a candle composition and, more specifically, to a candle or candle composition that is comestible when melted.

2. Description of the Related Art

Candle making was developed independently in many countries throughout history. The earliest known candles were made from the flammable fat of various animals, such as whales, fish, or insects. Waxes from plant sources were also subsequently used. First with the discovery of distilled petroleum products, and then later with the invention of the electric light, the use and need for candles as illumination waned. Consequently, further technological development in the field was greatly diminished, and candles became more for decorative use.

Of the decorative uses today, one tradition that is widespread is the use of candles on a birthday cake to celebrate one's birthday. Traditionally, one candle for each year is placed on the cake and lit, with the honoree blowing out the candles after song or congratulations. Recent innovations include the use of candles shaped like numbers or digits to as to limit the total number of candles being used. While the candles do not remain lit for any length of time, these birthday candles do melt, causing contamination of the confection with the melted wax of the candle.

While not harmful, the ingestion of wax or tallow is unappetizing.

The present invention eliminates such an inconvenience by providing candles made from not only edible materials, but from palatably desirable compositions. The present invention is a candle that is comprised substantially of cocoa butter and chocolate. As such, the candle, when lit, can create a pool of melted, edible chocolate where a pool of unappetizing wax would otherwise be, creating (potentially) even an improved gastronomic effect.

A search of the prior art for a solution to the problem did not disclose any patents that read directly on the claims of the instant invention; however, the following references, considered related, were found.

U.S. Pat. No. 6,099,877 discloses a food product that maintains a flame comprising an edible wick. The food product may be surrounded by an edible, meltable foodstuff. Also disclosed is a string-less wick, which may be used in an edible candle or a non-edible candle or serve as an edible or non-edible candle itself.

U.S. Pat. No. 6,406,733 discloses a method of producing shaped, embossed, or decorated confectionery chocolate products by using chilled forming, shaping, or embossing devices.

U.S. Pat. No. 6,599,334 discloses a solid fuel candle which is highly adapted for use both in a container and also as a free-standing candle includes a synthetic wax composition formed from alpha olefin monomers and oligomers under free radical conditions at relatively low pressures to yield a highly branched polymer wax having congealing and melting points lower than the starting alpha olefin material and a higher molecular weight.

U.S. Pat. No. 6,652,897 discloses an edible film and method of using same for decorating foodstuffs, in particular baked goods, wherein anyone can easily, inexpensively and artistically decorate foodstuffs. The edible film according to the present invention is composed of an edible polymer film which is preferably releasably mounted upon a flexible substrate to provide a reinforced edible film. The edible film is peelably released from the substrate to provide decorations for the foodstuff. The edible film may be decoratively prepared into predetermined decorations prior to distribution, which may include being pre-printed, pre-cut, colored, or being of pre-selected opacity and sheen. Pre-printing may be accomplished by any suitable printing process utilizing edible inks.

U.S. Pat. No. 4,131,415 discloses a system for the production of dipped taper candles, including an overhead conveyor system supporting mobile carrier racks for formation of the candles in suspended relation from the rack, and including a wicking station for providing rows of candle wicks in generally tensioned suspended relation from a carrier rack, a dipping station for automatically dipping said wicks on the rack through a predetermined number of dipping cycles, a cutoff station for cutting off the bases including the wick tensioning weights of the candles suspended from the carrier rack, a butt forming station for heat forming the cut butt ends of candles suspended from the carrier rack, and a cut down station for expeditiously cutting down the carrier rack rows of the candles formed on the candle wicks and for collecting the same for further processing.

And, U.S. Pat. No. 4,950,145 disclose a chocolate mold filling apparatus having chocolate molds having different number of cavity, cavity volume, cavity fill opening height, and cavity fill opening spacing characteristics. Each mold further has a base flange which incorporates a process code keyed to the mold different characteristics. A sensor detects the base flange process codes and controls a connected conveyor, chocolate metering pump, and chocolate mold fill tube.

SUMMARY OF THE INVENTION

It is an object of the present invention to provide a candle composition that is both comestible and combustible.

It is a further object of the present invention to provide candles or candle compositions made from only edible materials.

It is yet a further object of the present invention to provide such a candle or candle composition that is formed from palatably desirable compositions.

Briefly described according to the present invention, a candle is provided that is comprised substantially of cocoa butter and chocolate. The ratio of these ingredients being approximately between three parts to approximately five parts cocoa butter to one part chocolate provides a composition that is moldable and capable of being formed into a self supporting candle structure that is capable of being lit and maintaining a flame. At the same time, the unignited portions, when melted, creates a pool of melted, edible chocolate flavor material. Inclusion of trace amounts of sugar and vanilla improve the palatability and gastronomic effect of the melted material.

The chocolate wax composition of the present invention can be used to make a variety of candles including birthday candles and adult novelty/edible massage candles of various shapes, sizes, flavor variations, and colors.

BRIEF DESCRIPTION OF THE DRAWINGS

The advantages and the features of the present invention will become better understood with reference to the following and the more detailed description and the claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
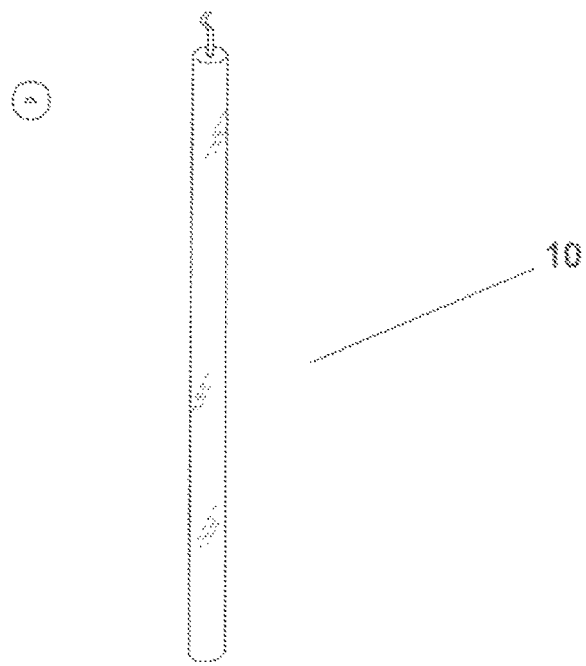
FIG. 1 is an elevational view of the candle 10 according to the preferred embodiment of the present invention; and, FIG. 2 is a perspective view thereof showing the candle 10 partially melted and forming a comestible element.
Figure 2:
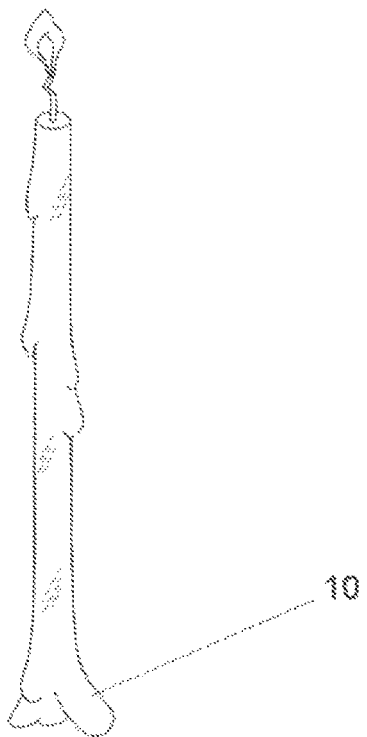

Referring now to FIG. 1, a candle, generally noted as 10, is shown according to the preferred embodiment of the present invention that is made from a candle composition that is comestible when melted. The candle 10 may be shaped or formed to look similar to a typical wax type cylindrical candle, as shown; however. it is anticipated that the candle 10 can alternately and equivalently be shaped or formed in any other shape, and it would be obvious to one having ordinary skill in the relevant art, in light of the present teachings, to so shape or form the candle 10 to achieve a desired appearance. The candle 10 includes an elongated wick 12 formed of an absorbent material that is designed to allow migration of a liquid (when melted) fuel into and up the wick, thereby forming a combustible edible oil for creating and sustaining a flame. While it is anticipated that any otherwise conventional wick material can be used in combination with the present invention, in a preferred embodiment it is anticipated that this wick material may further be formed of an edible product, such as, for example, a rice paper material. Surrounding the wick 12 is a candle body 14 that is composed of a mixture of a cocoa butter, chocolate solids, sugar, and vanilla. While is it anticipated that additional binding agents or stabilizers can be included, in its most basic form these four ingredients can be used and are all natural and organic.

The composition for forming the candle body is formed by a ratio of cocoa butter and chocolate solids such that it form a combustible product. This has been found to be approximately a minimum of a 3:1 ratio of cocoa butter to chocolates solids. Additionally, it has been found that this ratio of cocoa butter to chocolates solids can be greater than a 3:1 ration, and that a ration as high as approximately 5:1 ratio. Such a ratio between the ranges of approximately between 3:1 to approximately 5:1 provides a composition that is moldable and capable of being formed into a self supporting candle structure that is capable of being lit and maintaining a flame. At the same time, the unignited portions, when melted, creates a melted material that maintains edibility and possess a chocolate flavor. Inclusion of trace amounts of sugar allow for the melted material maintain a flavor similar to chocolate. However, it has been found that the inclusion of too much sugar quickly eliminates the flamability of the composition, while removal of any sugar creates a more bitter flavored product that, to most, would not achieve the desired gastronomic effect. Additionally, inclusion of vanilla into the composition improves aroma of the candle composition as well as the aroma of the candle when ignited, as well as improves the overall palatability of the melted material.

It is intended that the chocolate-wax composition as used in the present invention may be tempered prior to being used to make candles. As a person having ordinary skill in the relevant art should understand, when melted chocolate returns to a solid form the cocoa butter in the chocolate forms a crystal structure. This crystal structure can vary depending upon the the temperature at which the crystals are formed. For example, if the chocolate is allowed to cool on its own, the crystals of fat will be loose, resulting in a chocolate that is dull in appearance, soft & malleable, and greasy to the touch. This loose crystalline structure has a slightly lower melting point than tempered chocolate crystals. If, instead, while cooling, the chocolate is kept at 88° F. (31° C.), the loose crystal structure will not form (88° F. is above the formation point of the loose crystals). At this temperature the cocoa butter forms a denser crystalline structure. Holding the chocolate at this temperature and stirring will thereby allow greater formation of these stable crystal structures to form, providing the presence of "seed" crystals to form in the chocolate. When the chocolate is finally allowed to fully cool, if there are enough stable seed crystals, then the chocolate will harden into a very stable hard chocolate with a slight sheen, snap when broken. Such chocolate may keep for months at cool room temperatures.

Tempered chocolate provides enough stability to be worked into a variety of shapes. It also helps prevent the cocoa butter from rising to the surface of the chocolate and blooming into unsightly light brown markings or coatings. Further still, it has been found that this tempering also aids in making candles formed therefrom burn in a manner that is more aesthetically acceptable.

A typical edible candle 10 according to the present invention can be made of the candle composition by any number of methods. The candle 10 can be made by dipping the wick it in a melted composition in a normal candle making method. Alternately, the candle composition can be poured into a mold and around a wick and set through chilling. Such a molding method is amenable to automation. Finally, it if felt that the candle composition would be further capable of being adapted to an injection molding process, in which a mold would be set with the wicks and, if desired, a graphic films. Subsequently, the chocolate/cocoa butter composition may be injected at a temperature that maintains a soft and pourable consistency. Subsequent cooling the mold would then solidify the composition so that the candles could detach from the mold when opened.

2. Operation of the Preferred Embodiment

To utilize the preferred embodiment of the present invention, a candle of the present invention is capable of being used in a manner similar to any conventional candle. The features and benefits are particularly apparent when used in combination with foodstuffs, such as, for example, a birthday cake. In such use, the candle, when lit, can create a pool of melted, edible chocolate where a pool of unappetizing wax would otherwise be, creating (potentially) even an improved gastronomic effect. It is additionally envisioned that the chocolate-wax composition forming a candle of the present invention can further be used to make a variety of candles including adult novelty/edible massage candles of various shapes, sizes, flavor variations, and colors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A candle apparatus consisting of:
    a wick;
    a candle body formed by a composition of about a 3:1 ratio of cocoa butter to chocolates solids; sugar; and vanilla;
    wherein the candle body when melted forms an edible material maintain a flavor similar to chocolate.

2. In a candle having a wick formed of an absorbent material and a candle body providing fuel that is absorbable into the wick and combustible while it moves it upward during the burning of said candle, the candle further comprising:
    said candle body formed by a composition of between about a 3:1 ratio of cocoa butter to chocolates solids and about a 5:1 ratio of cocoa butter to chocolates solids.

3. The candle of claim 2, wherein said wick further being formed of an edible material.

4. The candle of claim 3, wherein said wick is formed of rice paper.

5. The candle of claim 2, wherein said candle body further comprises sugar and vanilla such that an overall composition of between about a 3:1 ratio of cocoa butter to all other solids and about a 5:1 ratio of cocoa butter to all other solids is maintained.

6. The candle of claim 2, further comprising said combination of cocoa butter and chocolate solids is tempered prior to forming said candle.

* * * * *